United States Patent
Xiao

(10) Patent No.: US 7,462,679 B1
(45) Date of Patent: Dec. 9, 2008

(54) PROCESS FOR PREPARING FUNCTIONALIZED OILS; ADHESIVES AND COATINGS AND INTERPENETRATING POLYMER NETWORKS PREPARED FROM THE FUNCTIONALIZED OILS

(76) Inventor: Han Xiong Xiao, 7309 Kingswood, Bloomfield Hills, MI (US) 48301

( * ) Notice: Subject to any disclaimer, the term of this patent is extended or adjusted under 35 U.S.C. 154(b) by 418 days.

(21) Appl. No.: 10/723,062

(22) Filed: Nov. 26, 2003

Related U.S. Application Data

(60) Provisional application No. 60/429,440, filed on Nov. 27, 2002.

(51) Int. Cl.
| | |
|---|---|
| C08G 18/28 | (2006.01) |
| C08G 18/00 | (2006.01) |
| C08G 18/09 | (2006.01) |
| C08G 18/08 | (2006.01) |
| C08L 91/00 | (2006.01) |
| C08L 75/04 | (2006.01) |
| C08L 75/14 | (2006.01) |

(52) U.S. Cl. .......................... 528/74.5; 528/44; 528/49; 528/53; 528/65; 528/68; 528/71; 524/589; 524/590; 524/591

(58) Field of Classification Search ................... 528/44, 528/49, 53, 65, 68, 71, 74.5; 524/589, 590, 524/591
See application file for complete search history.

(56) References Cited

U.S. PATENT DOCUMENTS

| | | | | |
|---|---|---|---|---|
| 1,979,260 | A | * | 11/1934 | Gauerke .................. 528/295.5 |
| 2,566,169 | A | | 8/1951 | Coffey |
| 3,079,354 | A | | 2/1963 | Goldblatt |
| 3,177,167 | A | * | 4/1965 | Skreckoski et al. ......... 528/74.5 |
| 3,318,828 | A | * | 5/1967 | Seiner ........................ 554/106 |
| 3,321,419 | A | * | 5/1967 | Kennedy .................... 527/301 |
| 3,412,054 | A | * | 11/1968 | Milligan et al. ............. 524/591 |
| 3,758,427 | A | * | 9/1973 | Katsibas ..................... 523/415 |
| 3,880,694 | A | | 4/1975 | Freeman et al. |
| 3,984,444 | A | | 10/1976 | Ritz et al. |
| 4,046,729 | A | | 9/1977 | Scriven et al. |
| 4,066,591 | A | | 1/1978 | Scriven et al. |
| 4,183,833 | A | | 1/1980 | Miyaguchi et al. |
| 4,268,426 | A | | 5/1981 | Williams et al. |
| 4,752,637 | A | | 6/1988 | Israel |
| 5,075,415 | A | | 12/1991 | Yotsumoto et al. |
| 5,324,590 | A | | 6/1994 | Nylund et al. |
| 5,504,145 | A | * | 4/1996 | Treasurer .................... 524/591 |
| 5,607,633 | A | | 3/1997 | Sleeter et al. |
| 5,719,301 | A | | 2/1998 | Sleeter |
| 5,786,072 | A | | 7/1998 | Hsu et al. |
| 5,942,058 | A | | 8/1999 | Sleeter et al. |
| 6,001,286 | A | | 12/1999 | Sleeter |
| 6,239,209 | B1 | | 5/2001 | Yang et al. |
| 6,277,310 | B1 | | 8/2001 | Sleeter |
| 2002/0103091 | A1 | | 8/2002 | Kodali |

FOREIGN PATENT DOCUMENTS

| | | |
|---|---|---|
| EP | 0 736 593 A1 | 10/1996 |
| EP | 0 780 441 A2 | 6/1997 |
| WO | WO 99/21900 | 5/1999 |
| WO | WO 02/31021 | 4/2002 |

OTHER PUBLICATIONS

Harry Burrell.Pentaerythritol drying oils. Journal of the American Oil Chemists' Society. vol. 21, No. 7 / Jul. 1944.pp. 206-211.*
J.C. Konen. Drying oils—Past, present, future. Journal of the American Oil Chemists' Society. vol. 21, No. 7 / Jul. 194. pp. 202-204.*

* cited by examiner

*Primary Examiner*—Sanza L McClendon
(74) *Attorney, Agent, or Firm*—Gary C Cohn PLLC

(57) ABSTRACT

Glycerides of acids having conjugated groups of aliphatic carbon-carbon double bonds, such as tung oil, are functionalized by reaction with certain polyol compounds at mild conditions. The functionalized oils are useful in a variety of coating and adhesive applications. They can be cured with melamine-formaldehyde, urea-formaldehyde, benzoguanimine-formaldehyde and/or glycoluril-formaldehyde resins. They can be reacted with polyisocyanates to form polyurethanes, and urethane-group containing prepolymers. Of particular interest are water-dispersible prepolymers, which can be used to make anionic, cationic or nonionic polyurethane dispersions for coating, adhesive and sealant as well as composites applications.

9 Claims, No Drawings

PROCESS FOR PREPARING FUNCTIONALIZED OILS; ADHESIVES AND COATINGS AND INTERPENETRATING POLYMER NETWORKS PREPARED FROM THE FUNCTIONALIZED OILS

CROSS-REFERENCE TO RELATED APPLICATION

This application claims benefit of U.S. Provisional Application 60/429,440, filed Nov. 27, 2002.

BACKGROUND OF THE INVENTION

This invention relates to methods of making certain functionalized oils having conjugated aliphatic double bonds; adhesive compositions containing those functionalized oils, and aqueous polyurethane dispersions prepared using those functionalized oils.

Various types of plant oils are known as "drying oils" because they have the ability to polymerize in the presence of oxygen to form a hard coating. Examples of such drying oils are linseed oil and tung oil. These oils are mainly glycerides of unsaturated fatty acids. The number and location of carbon-carbon double bonds in the fatty acids determines the extent to which the oil will polymerize and dry. In general, increasing the content of double bonds in the fatty acid groups improves the drying ability. Conjugated double bonds are usually more reactive than nonconjugated double bonds. Tung oil is an especially valuable drying oil. It contains a high proportion of fatty acid groups having three conjugated double bonds. Conjugated double bond-containing oils polymerize well in the presence of oxygen at room temperature to form a high quality, highly water-resistant coating.

Attempts have been made to develop synthetic polymer systems that have drying properties similar to those of the "drying" plant oils. One method of accomplishing this is to incorporate the double bond structure from these drying oils into a synthetic polymer network. To do this, it is necessary to introduce functional groups onto the oils.

A convenient way of introducing functional groups such as hydroxyl groups onto a drying oil is to conduct a transesterification reaction between the oil and a polyol compound. This reaction creates a mixture of (mainly) mono- and di-fatty acid esters having one or more free hydroxyl groups. The free hydroxyl groups are reactive species that can be used to bond the functionalized oil into a variety of polymer structures such as alkyl resins and polyurethanes.

The transesterification reaction to form a functionalized oil does not work well using conventional polyols when the starting oil has highly reactive unsaturation, as is present in tung oil, for example. The usual polyols of choice, glycerine and pentaerythritol, require temperatures of 240° C. or higher in order to complete the transesterification reaction in reasonable lengths of time. The more reactive plant oils react under the conditions of the transesterification, increasing in viscosity and discoloring so badly that the product is not useful. Often, an intractable mass is created. There is also the risk of fire or explosion due to the exothermic auto-polymerization of the oil that can occur at those reaction conditions.

As a result, functionalized plant oils having significant proportions of highly reactive double bonds, such as conjugated double bonds, have not been successfully prepared on a commercial basis.

It would be desirable to provide a process by which highly reactive plant oils, particularly those containing a significant proportion of fatty acids having conjugated double bonds, can be functionalized to form good quality, low color and low viscosity products.

SUMMARY OF THE INVENTION

In a first aspect, this invention is a method for forming functionalized esters of unsaturated acids, comprising heating a mixture including (1) a polyol compound having at least 3 primary hydroxyl groups/molecule and a melting temperature of 220° C. or below and (2) a di- or triglyceride of one or more carboxylic acids of which at least 50% by weight have a conjugated group of at least two aliphatic carbon-carbon double bonds, said heating being conducted under conditions sufficient to form a mixture of hydroxyl group-containing esters of said acids in which at least 80% of the conjugated groups are unreacted.

In a second aspect, this invention is a hydroxyl- or isocyanate terminated, urethane group-containing prepolymer containing pendant aliphatic hydrocarbyl groups of from 8 to 22 carbon atoms, wherein at least 50% by weight of such hydrocarbyl groups contain a conjugated group of at least two aliphatic carbon-carbon double bonds.

In a third aspect, this invention is a dispersion of polyurethane particles in an aqueous phase, wherein the polyurethane particles contain pendant hydrocarbyl groups having a conjugated group containing at least two aliphatic carbon-carbon double bonds.

In a fourth aspect, this invention is a method for making a dispersion of polyurethane particles, comprising A. forming a water dispersible, isocyanate-terminated prepolymer by reacting a stoichiometric excess of a polyisocyanate with an isocyanate-reactive composition, the isocyanate-reactive composition including at least (1) an isocyanate-reactive compound having pendant hydrocarbyl or substituted hydrocarbyl groups that contain at least two aliphatic carbon-carbon double bonds in conjugation and at least one of (2) an isocyanate-reactive compound containing an anionic or cationic group or precursor to such an anionic or cationic group or (3) an isocyanate-reactive, nonionic hydrophilic compound;

B. if component (2) is used and contains a precursor to an anionic or cationic group, neutralizing said precursor to form an anionic or cationic group, C. dispersing the isocyanate-terminated prepolymer to form a plurality of prepolymer droplets stably dispersed in an aqueous phase; and D. reacting the dispersed isocyanate-terminated prepolymer with a chain extender to form a plurality of polyurethane particles stably dispersed in an aqueous phase.

In a fifth aspect, this invention is a method for forming functionalized esters of carboxylic acids, comprising heating a mixture including (1) a polyol compound having at least 3 primary hydroxyl groups/molecule and a melting temperature of 220° C. or below and (2) a di- or triglyceride of one or more carboxylic acids, said heating being conducted under conditions sufficient to form a mixture of hydroxyl group-containing esters of said acids.

DETAILED DESCRIPTION OF THE INVENTION

The starting material for functionalization is a di- or triglyceride of certain carboxylic acids. In preferred embodiments, at least 50% (preferably at least about 70%, more preferably at least about 75%) by weight of the fatty acids in the di- or triglyceride are fatty acids that contain a conjugated group of at least two aliphatic carbon-carbon double bonds.

The process of this invention is particularly suitable when the conjugated group contains at least three aliphatic carbon-carbon double bonds, i.e. a linkage represented by —CR═CR—CR═CR—CR═CR—, where each R is independently alkyl, substituted alkyl, aryl or substituted aryl but preferably hydrogen. The conjugated group preferably has 3 or 4 aliphatic carbon-carbon double bonds in conjugation. The fatty acid having the conjugated group conveniently contains from about 8 to about 32 carbon atoms and is preferably linear (i.e., each R is hydrogen). The fatty acid having the conjugated group more preferably contains from about 18 to 20 carbon atoms. Examples of preferred fatty acids are α-eleostearic acid, catalpic acid, punicic acid, calendic acid, jacaric acid (all C18 acids having 3 conjugated double bonds), α-parinaric acid (a C18 acid having 4 conjugated double bonds) and bosseopentaenoic acid (a C20 acid having 4 conjugated double bonds).

Most preferred starting materials are certain plant or animal oils. The oils are mainly di- and triglycerides of a mixture of fatty acids. Preferably, at least 50% (preferably at least 70%, more preferably at least 75%) by weight of the fatty acids in at least one of the oils used as the starting material (if a mixture of oils is used) contain a conjugated group containing at least 2, more preferably at least 3, aliphatic carbon-carbon double bonds in conjugation. Oils of this type may contain varying amounts of non-glyceride components such as phosphatides, sterols, tocopherols, fatty alcohols, hydrocarbons and coloring chemicals or pigments such as chlorophyll, carotene, xanthophyll and certain enzymes. Crude oils may also contain some residual biological matter and seed particles. However, the oil is preferably refined to remove these impurities before being functionalized.

A particularly preferred oil is tung oil. Tung oil contains a high proportion of glycerides of α-eleostearic acid and is readily available in commercial quantities.

Mixtures of oils can be used, including mixtures of oils as described above with oils that contain lower proportions of fatty acids with conjugated groups, and/or oils that do not contain conjugated groups. The other oil may be, for example, a drying oil like linseed oil or dehydrated castor oil, a semi-drying oil such as soybean oil, or a non-drying oil such as canola oil, corn oil or vegetable oil. These oils preferably constitute no more than about 75%, more preferably no more than 60%, and most preferably no more than 50% of the combined weight of all starting oils.

In addition, the starting material may be derived from fatty acids that have been treated to introduce conjugation, provided that the group contains at least 2, preferably at least 3 double bonds in conjugation. Suitable methods for introducing conjugation into fatty acid-containing oils are described in EP 0 736 593, U.S. Pat. No. 5,719,301 and U.S. Pat. No. 5,942,058, all incorporated herein by reference.

Most preferred starting materials are plant oils containing glycerides of fatty acids, where at least 75% of the fatty acids contain 3 or 4 aliphatic carbon-carbon double bonds in conjugation. The most preferred starting material is tung oil.

The oil is functionalized by reaction with a polyol to introduce hydroxyl groups. The polyol is one that contains at least three primary hydroxyl groups/molecule and has a melting temperature of 220° C. or below, preferably 200° C. or below. It has been found that polyol compounds meeting these parameters tend to react with oils having conjugated groups at relatively mild conditions of temperature (preferably below 230° C., more preferably 120-220° C., especially 160-210° C.) in reasonably short times (such as less than 4 hours, especially from about 1 to about 3 hours) to complete the functionalization reaction without causing the conjugated groups to react significantly. Preferred examples of such polyol compounds include trimethylolpropane, trimethylolethane, di-trimethylolpropane and the like.

The polyols engage in transesterification reactions with the glyceride compounds in the oil, resulting in an ester interchange between the oil ester groups and the hydroxyl groups of the polyol, to produce a mixture of hydroxyl-functional esters of the fatty acids contained in the oil. The reaction can be idealized as:

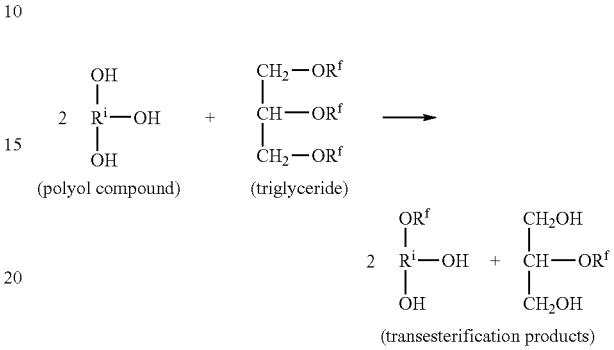

where $R^i$ represents the organic portion of the polyol compound and $R^f$ represents the fatty acid groups from the oil. It is noted that the transesterification reaction proceeds randomly, and the actual reaction products will be a mixture of compounds having zero, one, two and three or more $R^f$ groups. It is preferred to select proportions of starting polyol compound and oil such that the reaction product contains on average at least two free hydroxyl groups per molecule.

It is preferred to select reaction conditions under which at least 80%, especially at least 90%, most preferably at least 95% of the conjugated groups remain unreacted. In addition to the use of the particular polyol compound described above, and the temperature conditions, the reaction conditions further advantageously include an absence of oxygen, as oxygen tends to promote the autopolymerization of the conjugated groups. Use of nitrogen or other inert atmosphere is sufficient to accomplish this. By preserving the conjugated groups, a functionalized oil having a light color and low viscosity is produced. Further, the preserved conjugated groups are capable of engaging in drying reactions (as in the starting oil) when exposed to oxygen.

The transesterification reaction may be catalyzed to reduce the needed reaction temperatures and/or reduce reaction times. A wide range of transesterification catalysts are useful, including metal salts of inorganic and organic acids, such as calcium, lithium, potassium, magnesium, zinc, cerium and like salts, hydroxides of such metals, as well as litharge or soaps. Solid catalysts have the advantage of being easily filterable from the product functionalized oil. This is advantageous in some applications in which the functionalized oil is to be crosslinked with materials such as melamine-formaldehyde, urea-formaldehyde, benzoguanimine-formaldehyde and/or glycoluril-formaldehyde resins, where there transesterification catalyst tends to inhibit the crosslinking reaction. Suitable amounts of catalysts are up to 1% by weight of the starting materials, preferably from about 0.001 to about 0.1%, more preferably from about 0.005 to about 0.1%.

If desired, the functionalized oil may be treated to remove unreacted starting materials, colored by-products and the like before being used. The functionalized oil can be used with or without further purification as a reactant to from a variety of polymers, as described more below.

The functionalized oil can be used in the same manner as other polyhydroxy-containing raw materials to form a variety of polymers. The functionalized oil reacts with melamine-formaldehyde, urea-formaldehyde, benzoguanimine-formaldehyde and/or glycoluril-formaldehyde resins of various types to form an interpenetrating polymer network (IPN); with polyisocyanates to form polyurethane polymers; with polycarboxylic acids, acid chlorides and/or acid anhydrides to form polyesters and/or precursors for alkyl resins; and the like. In cases where the polymerization reaction is conducted under conditions that largely preserve the conjugated groups of the functionalized oil, the polymer will have corresponding pendant groups with conjugated unsaturation that can engage in secondary crosslinking reactions. These secondary crosslinking reactions will in many cases occur at low temperatures (such as 0-50° C.) in the presence of air or oxygen. This secondary crosslinking makes the polymers particularly useful in coating or adhesive applications. If desired, conditions can be selected (primarily the presence of oxygen) so that the conjugated groups react during the polymerization to form more highly crosslinked, IPN systems.

The functionalized oil can be crosslinked with a variety of melamine-formaldehyde, urea-formaldehyde, benzoguanimine-formaldehyde and/or glycoluril-formaldehyde resins. These resins preferably have low (such as less than 1%, preferably less than 0.5%) free formaldehyde. The crosslinking reaction will in most cases occur at elevated temperatures, typically from about 50-150° C., especially from about 80-130° C. This elevated temperature cure makes it possible to formulate one-component, heat-curable polymer systems using the functionalized oil. These polymers systems may be solvent-borne, neat, or water borne, depending on the particular characteristics of the functionalized oil and crosslinking resin. Because the conjugated groups on the functionalized oil can autopolymerize at these elevated temperatures, particularly if oxygen is present, a full interpenetrating polymer network (IPN) is formed when these polymer systems are fully cured.

Suitable melamine-formaldehyde resins include highly methylated resins such as Cymel™ 300, 301, 303, 350 resins; high imino resins such as Cymel™ 322, 323, 325, 327, 328, 345, 385 and 3717; partially methylated resins such as Cymel™ 370, 373 and 380; highly alkylated mixed ether melamine resins such as Cymel 1130, 1131, 1133, 1135, 1141, 1161 and 1168; high imino mixed ether resins such as Cymel™ 202, 203, 254 and 324; n-butylated resins such as Cymel™ 1151, 1156 and 1158; and isobutylated resins such as Cymel™ MI-8-I, MI-11-I and 255-10. Suitable urea-formaldehyde resins include methylated resins such as Beetle™ U-60 and U-65 and butylated resins such as Beetle™ U-80. Suitable benzoguanamine-urea resins include Cymel™ 1123 and 1125. Suitable glycoluril-formaldehyde resins include Cymel™ 1170, 1171, 1172 and 1179. All Cymel™ and Beetle™ resins are available from Cytec Industries, West Paterson, N.J.

The ratio of functionalized oil and melamine-formaldehyde, urea-formaldehyde, benzoguanimine-formaldehyde and/or glycoluril-formaldehyde resin can vary widely, depending on the properties that are desired in the cured polymer. Either the functionalized oil or the melamine-formaldehyde, urea-formaldehyde, benzoguanimine-formaldehyde and/or glycoluril-formaldehyde resin can be used in stoichiometric excess, or roughly the same stoichiometric quantities of each can be used. When excess melamine-formaldehyde, urea-formaldehyde, benzoguanimine-formaldehyde and/or glycoluril-formaldehyde resins are used, these can react with themselves to further cure the mixture. Thus, the blends of functionalized oil and these resins may contain from 5%, preferably from 10% more preferably from 25%, to 95%, preferably to 90%, more preferably to 75% by weight of the functionalized oil.

The functionalized oil can be cured directly via reaction with a polyisocyanate to form a polyurethane or a prepolymer (which may be hydroxyl-terminated or isocyanate-terminated, depending on stoichiometry) that is further curable for form a polyurethane or IPN.

Suitable organic polyisocyanates include aliphatic, cycloaliphatic, arylaliphatic and aromatic isocyanates and mixtures thereof. Aliphatic isocyanates, especially aliphatic polyisocyanates are preferred in coatings and adhesives applications due to their generally superior light-stability, compared to aromatic polyisocyanates.

Examples of suitable aromatic isocyanates include the 4,4'-, 2,4' and 2,2'-isomers of diphenylmethane diisocyanate (MDI), blends thereof and polymeric and monomeric MDI blends, polyarylpolyisocyanates including the so-called "crude" MDI products, toluene-2,4- and 2,6-diisocyanates (TDI), m- and p-phenylenediisocyanate, chlorophenylene-2, 4-diisocyanate, diphenylene-4,4'-diiso-cyanate, 4,4'-diisocyanato-3,3'-dimethyldiphenyl, 3-methyldiphenyl-methane-4, 4'-diisocyanate, diphenyletherdiisocyanate, 2,4,6-triisocyanatotoluene and 2,4,4'-triisocyanatodiphenylether.

Mixtures of isocyanates may be used, such as the commercially available mixtures of 2,4- and 2,6-isomers of toluene diisocyanates. A crude polyisocyanate may also be used in the practice of this invention, such as crude toluene diisocyanate obtained by the phosgenation of a mixture of toluene diamine isomers or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, saturated analogues of the above mentioned aromatic isocyanates and mixtures thereof.

The functionalized oil may be reacted directly with the polyisocyanate by mixing at approximately room temperature or an elevated temperature. The functionalized oil may be used alone to react with the polyisocyanate, or if desired may be used in conjunction with one or more other isocyanate-reactive materials, as described more fully below. In this manner, a wide variety of types of polyurethane polymers can be formed, including substantially noncellular elastomers, flexible foams, rigid foams, rigid or flexible polyurethanes, crosslinked structural polyurethanes, and the like. These polyurethanes may be produced using a variety of standard processing methods such as casting, reaction injection molding, slabstock foam processes, molded foam processes, and the like.

The conjugated groups provided by the functionalized oil can be preserved when the functionalized oil is reacted with the polyisocyanate. This is preferred when making prepolymers and high molecular weight polyurethanes for coating or adhesive applications. Preserving the conjugated groups allows the formation of a polyurethane that can participate in subsequent cross-linking reactions due to the later cure of the conjugated groups. Alternatively, conditions can be selected so that the conjugated groups autopolymerize as the polyurethane is formed, thereby creating a more highly crosslinked polymer structure. To prevent the conjugated groups from reacting, the reaction is preferably conducted in the substantial absence of oxygen (such as under a nitrogen blanket) and moderate temperatures (below 180° C., especially below 110° C., most preferably below about 100° C.).

Thus, in one aspect of the invention, the polyurethane-forming reaction is conducted under conditions such that at least 70%, more preferably at least 80%, especially at least 85% of the conjugated groups do not react.

The reaction of the functionalized oil and the polyisocyanate is typically catalyzed using urethane catalysts such as tertiary amines, salts and chelates of various metals, particularly tin salts such as dialkyl tin dioctoates, and the like. The reaction may be performed neat or in a solvent if desired.

The functionalized oil will generally be used in conjunction with other isocyanate-reactive materials when making a prepolymer or high molecular weight polyurethane. In addition, blending the functionalized oil with another isocyanate-reactive material can facilitate mixing by reducing viscosity and/or increasing compatibility. Suitable other isocyanate-reactive materials include compounds preferably having on average up to about 8, more preferably up to about 6, even more preferably up to about 4 and especially up to about 2 isocyanate-reactive groups per molecule.

A large number of suitable isocyanate-reactive materials are described in columns 3-5 of U.S. Pat. No. 4,394,491 incorporated herein by reference. Among these are polyethers and polyester polyols. If a more flexible, lower glass transition temperature polyurethane is desired, an additional isocyanate-reactive material having an average equivalent weight per isocyanate-reactive group of from about 250 to about 8000, preferably about 500 to about 3000, more preferably about 500 to about 2500, is useful. Particularly preferred are the polyether polyols that are polymers of a $C_{2-4}$ alkylene oxide or tetrahydrofuran. These can be used in admixture with other isocyanate-reactive materials that have equivalent weights as low about 31, if desired. Especially preferred isocyanate-reactive materials are polymers of propylene oxide or block or random copolymers of propylene oxide and ethylene oxide.

Other especially preferred isocyanate-reactive materials are polymers of propylene oxide and polyester polyols, such as 1,4-butanediol adipate polyester polyols.

If a more rigid polyurethane is desired, the isocyanate-reactive materials having an equivalent weight of about 31 to about 200 are useful, such as glycerine, ethylene glycol, propylene glycol, dipropylene glycol, trimethylolpropane, pentaerythritol, toluene diamine, diphenylmethane diamine, and the like.

To form a high molecular weight polyurethane, about 0.7 to about 3.0 equivalents of isocyanate groups are provided per equivalent of isocyanate-reactive group. A preferred range is from about 0.95 to about 1.40. Use of more than about 1.5 equivalents of polyisocyanate groups per equivalent of isocyanate-reactive group will favor formation of a low molecular weight prepolymer, unless a trimerization catalyst (such as an alkali metal salt) is used.

In making a high molecular weight polyurethane, it is preferred that the functionalized oil constitute from about 1 to about 80, preferably from about 1 to about 25, more preferably from about 2 to about 10, especially from about 4 to about 8 percent of the total weight of all isocyanate-reactive materials plus the polyisocyanates. The resulting prepolymer and/or polyurethane will contain corresponding amounts of pendant hydrocarbyl groups. These amounts provide the polyurethane with sufficient amounts of conjugated groups to engage in secondary crosslinking (drying).

The reaction mixture used to make the high molecular weight polyurethane (or prepolymer) may of course include other additives such as are used in making polyurethanes of various types, including blowing agents, nucleating agents, mold release agents, surfactants, foam stabilizers, cell openers, catalysts, preservatives, antioxidants, biocides, reinforcing agents, fillers, and the like.

By adjusting the stoichiometry of the reaction, urethane group-containing prepolymers are produced that have terminal isocyanate groups (if the polyisocyanate is used in excess) or hydroxyl groups (if the isocyanate-reactive components, including the functionalized oil, are used in excess). Prepolymers are preferably prepared under conditions such that the conjugated groups of the functionalized oil remain substantially unreacted. These prepolymers are useful intermediates in forming a variety of coatings and adhesives, as they are typically liquids at room temperature (about 22° C.) and/or readily dispersible in a variety of carrier systems. The prepolymers preferably have an NCO-content of about 0.5 wt. % to about 35 wt. % based on the total weight of the prepolymer. Optimal isocyanate contents will vary depending on the application. Higher isocyanate content prepolymers (such as from about 12-35% NCO) tend to form more rigid, higher glass transition temperature polyurethanes. Prepolymers having lower NCO contents generally form more flexible polyurethanes. A preferred isocyanate content for many applications is from about 0.5 to about 12 wt. %, more preferably from about 1 to about 8 wt. %. Hydroxyl-terminated prepolymers preferably have an OH— content of about 0.2 wt. % to about 15 wt. %, preferably from about 0.2 wt. % to about 5 wt. % and especially from about 0.4 wt. % to about 3.5 wt. %.

Isocyanate-terminated prepolymers can be formed into high molecular weight polyurethanes through reaction with a chain extender or crosslinker. The chain extender or crosslinker is a material that has at least two isocyanate-reactive groups, a weight per isocyanate-reactive group of about 500 daltons or less, preferably about 150 daltons or less, especially 80 daltons or less, and which reacts with the prepolymer to form urethane and/or urea linkages between prepolymer molecules. Suitable chain extenders/crosslinkers include polyols, various aliphatic diamines, alkanolamines, various hydrazines, aminoalcohols and polyamines. Hydrazines and polyamines are preferred when making polyurethane dispersions as described more below. Polyols and blocked amines (such as NaCl-blocked methylene dianiline) are preferred in cast elastomer and molded foam applications. Aromatic diamines are preferred in reaction injection molding applications. Alkanolamines are preferred in slabstock foam applications. Specific examples of useful chain extenders/crosslinkers include glycerine, ethylene glycol, diethylene glycol, trimethylolpropane, propylene glycol, dipropylene glycol, pentaerythritol, ethanolamine, isopropanol amine, diethanol amine, diisopropanol amine, ethylene diamine, diethylene triamine, triethylenetetraamine, propylene diamine, butylene diamine, cyclohexylenediamine, piperazine, 2-methyl piperazine, phenylenediamine, toluene diamine, tris(2-aminoethyl)amine, 4,4'-methylene-bis(2-chloroaniline), 3,3'-dichloro-4,4'-diphenyldiamine, 4,4'-diphenyldiamine, 2,6-diaminopyridine, 4,4'-diamine diphenylmethane, isophorone diamine, diethyltoluene diamine, aminoethylethanolamine and adducts of diethylene triamine.

Hydroxyl-terminated prepolymers will react with polyisocyanate compounds to form polyurethanes and/or polyureas. If the polyisocyanate is blocked (as with caprolactam, diethyl malonate, phenol or ketone oxime), the reaction between the hydroxyl-terminated prepolymer and polyisocyanate will be heat-activated. This permits the formation of one-component, curable polyurethane adhesives and coatings. Two-component polyurethane adhesives and coatings can be prepared using polyisocyanate compounds that are not blocked.

Hydroxyl-terminated prepolymers can also be reacted with melamine-formaldehyde, urea-formaldehyde, benzoguanimine-formaldehyde and/or glycoluril-formaldehyde resins to form a crosslinked polymer. The reaction between the prepolymer and the melamine resin occurs at elevated temperatures, such as from 80-140° C., similar to the reaction of the functionalized oil itself with those resins. This allows the prepolymer and of melamine-formaldehyde, urea-formaldehyde, benzoguanimine-formaldehyde and/or glycoluril-formaldehyde resin to be packaged together if desired to form a one-component adhesive or coating system. Curing will usually cause the conjugated groups to react at the same time, especially if oxygen is present, to form an IPN. The melamine-formaldehyde, urea-formaldehyde, benzoguanimine-formaldehyde and/or glycoluril-formaldehyde resins described above are also suitable for reaction with a hydroxyl-terminated prepolymer.

The prepolymers, whether hydroxyl- or isocyanate-terminated, can be rendered water-dispersible through the incorporation of hydrophilic groups. By "water-dispersible", it is meant that the prepolymer is capable of being dispersed in water to form a dispersion of prepolymer droplets in the aqueous phase without significant separation of the aqueous and prepolymer phases into layers. Hydrophilic groups include anionic groups, such as carboxylic acid salts, sulfonic acid salt groups and the like; cationic groups, such as quaternary amine salt groups, and nonionic hydrophilic groups, such as poly(ethylene oxide) chains.

Anionic groups are conveniently introduced into the prepolymer by incorporating into the reaction mixture a compound that contains one or more, preferably 2 or more, isocyanate-reactive groups such as hydroxyl or primary or secondary amino groups and either an anionic group or an acid (such as carboxylic acid or sulfonic acid) group that can be later neutralized to form an ionic group. Most preferred compounds of this type are hydroxy-functional carboxylic acids, of which dimethylolproprionic acid (DMPA) is most preferred, and half-esters of a polyol and an anhydride, such as trimellitic anhydride half esters as described in U.S. Pat. No. 4,268,426.

Preferred anionic groups are carboxylic acid salts, as these allow the dispersion to be destabilized when desired by affecting changes the pH of the dispersion. The counter ion on the carboxylic acid salt is preferably a monovalent metal, ammonium ion, or a low molecular weight amine (such as a trialkyl amine, where the alkyl groups have up to three, preferably up to two carbon atoms. Amine counter ions (and ammonia) will extract the proton from the acid group to form the corresponding ammonium/carboxylate ion pair. Thus use of a volatile counterion such as ammonia or low molecular weight amine provides for the possibility of using heat as a method of driving off the counterion to regenerate carboxylic acid groups and destabilize the dispersion when desired.

Cationic groups are conveniently introduced in an analogous way, using a compound that contains a basic group (such as a tertiary amine) that can be later neutralized to form a cationic group. Examples of such compounds are N-methyldiethanolamine (NMDEA) and N-ethyldiethanolamine. Preferred cationic groups are salts of strong amine bases ($—N^+R^1_3$, where each $R^1$ is alkyl or substituted alkyl with organic or inorganic acids). The counter ion is formed through the neutralization of the basic tertiary amine groups with an organic or inorganic acid. The counterion is preferably a monovalent ion such as acetate, formate or halide (especially chloride or bromide ion). Most preferred are acetic acid and HCl salts of weak amine bases.

Preferred nonionic hydrophilic groups include poly(ethylene oxide) chains having a weight of about 100-5000 daltons, or random and/or block copolymers of ethylene oxide and another alkylene oxide such as propylene oxide of similar weight, provided that the ethylene oxide constitutes at least about 50% of the total weight of the chain. Monofunctional polymers and copolymers of ethylene oxide react with the polyisocyanate during prepolymer formation to form pendant nonionic groups of this type, whereas those having two or more hydroxyl groups will form a prepolymer having the hydrophilic group incorporated into the prepolymer backbone.

Prepolymers having sufficient amounts of hydrophilic groups are water-dispersible, and therefore can be used to form a variety of curable, water-borne polymer systems that are suitable for coatings and adhesives applications. A dispersion of such a hydroxyl-terminated prepolymer can be blended with a melamine-formaldehyde, urea-formaldehyde, benzoguanimine-formaldehyde and/or glycoluril-formaldehyde resin of the types described above to form a heat-curable, one-component system. The melamine-formaldehyde, urea-formaldehyde, benzoguanimine-formaldehyde and/or glycoluril-formaldehyde is preferably water-miscible or compatible with the prepolymer, so that it can be blended with the prepolymer dispersion to form a compatible mixture. Examples of such resins that are water-miscible and/or compatible with such water-dispersible prepolymers include Cymel™ 303, 350, 325 and 380 and Beetle™ U-60, U-65 and 1172 resins. A dispersion of such a hydroxyl-terminated prepolymer can be blended with a blocked polyisocyanate to form a one-component, heat-curable polyurethane system. A dispersion of an isocyanate-terminated prepolymer can be used to form one-component polyurethane systems, using, for example, a polyvinyl alcohol solution, a melamine-formaldehyde, urea-formaldehyde, benzoguanimine-formaldehyde and/or glycoluril-formaldehyde dispersion or solution, a polyol composition or even water as the second component. When these one-component systems are cured, the prepolymer and other polymer react and conjugated groups autopolymerize to form interpenetrating polymer networks (IPNs).

An application of particular interest is the formation of aqueous polyurethane dispersions. These polyurethane dispersions contain a continuous aqueous phase, in which polyurethane polymer particles are dispersed. The particle size is not especially critical provided that the particles remain stably dispersed in the aqueous phase. A preferred range of particle sizes is from about 0.001 to about 50 microns. A more preferred range of particle sizes is from about 0.1 to about 20 microns. The polyurethane particles can constitute from about 1% to about 70% of the total weight of the dispersion. It is generally convenient to prepare the dispersion at a relatively high solids contents (such as from about 30-60%) solids, and then dilute it as convenient for particular applications.

In order to keep the polyurethane dispersed in the aqueous phase, it is usually necessary to use an external stabilizer, an internal stabilizer, or some combination of these. It is preferred to use an internal stabilizer, i.e., a hydrophilic group bonded into the polyurethane polymeric structure, either alone or in conjunction with an external stabilizer. Preferred internal stabilizers are cationic, anionic or nonionic hydrophilic groups incorporated into the polyurethanes via a urethane group-containing prepolymer as described above.

If the polyurethane is not sufficiently stabilized internally, the dispersion may contain one or more external surfactants. Suitable surfactants include random or block copolymers of ethylene oxide and propylene oxide and/or butylenes oxide; various type of silicone surfactants, salts of long-chain carboxylic acids, and the like.

The aqueous phase of the dispersion may also contain one or more hydrophilic organic solvents to assist in producing a stable dispersion of the polyurethane particles, but it is preferred to minimize or even eliminate the use of such solvents. The aqueous phase of the final dispersion preferably contains less than 25% by weight of organic compounds having a molecular weight of less than 250, more preferably contains less than 5% by weight of such compounds and most preferably contains less than 1% by weight of such compounds.

A convenient method of forming the polyurethane dispersion is to form a water-dispersible NCO-terminated prepolymer containing hydrophilic groups as described above, disperse the prepolymer in the aqueous phase, and then chain-extend the prepolymer to form the dispersed polyurethane particles. Using a water dispersible prepolymer provides several advantages such as promoting the formation of small droplets (which tends to promote stability) and reducing or eliminating the need for external stabilizers.

The prepolymer is dispersed into an aqueous phase under conditions that the prepolymer/monomer mixture forms droplets dispersed in the aqueous phase that have an average diameter of from about 5000 nm or less. If the prepolymer contains acid or base groups, these are preferably neutralized before the prepolymer is dispersed into the aqueous phase. Preferably, the droplets thus formed have average diameters of from about 30 nm, more preferably to 50 nm, even more preferably from about 100 nm, to about 1000 nm, more preferably to about 500 nm, even more preferably to about 300 nm. It is generally necessary to mix the prepolymer and aqueous phase under conditions of high shear in order to obtain these droplet sizes. This can be achieved by mechanical mixing, ultrasonic mixing or other mixing methods. The dispersed prepolymer preferably constitutes from about 10% to about 70% of the total weight of the dispersion, especially from about 30 to 60% of the weight of the dispersion.

A chain extender is added to the resulting dispersion and caused to react with the prepolymer to form polyurethane or poly(urethane-urea) particles. Although in principle the chain extender can be water from the aqueous phase, in practice the prepolymer does not react with the water to a significant extent and the performance of resultant polyurethane is not good. Therefore, an additional chain extender is preferably added. Suitable chain extenders are as described above, with amine or alkanolamine chain extenders being preferred. Water-soluble chain extenders are most preferred, as maintaining the chain extender and prepolymer in separate phases helps to retard premature chain extension.

The chain extension may be conducted at an elevated temperature, such as from about 30 to about 100° C., taking care to avoid conditions under which the conjugated groups react to a significant extent. The chain extension reaction may be catalyzed using catalysts of the type described with respect to the preparation of the prepolymer. The dispersion is preferably agitated during the chain extension reaction.

The resulting dispersion contains polyurethane or poly (urethane-urea) particles having pendant hydrocarbyl groups containing the conjugated group of at least two, preferably three or more, double bonds in conjugation. These conjugated groups will autopolymerize at temperatures ranging from 0° C. or higher in the presence of oxygen. This autopolymerization reaction introduces both intra- and interparticle crosslinking. It also results in the formation of a hydrophobic polymer network. As a result, the dispersion of the invention can be used in a wide variety of coating, adhesive and sealant applications to provide strong, water-resistant polymers. The coatings also tend to exhibit good chemical resistance, good hardness and toughness, and good mechanical properties (such as tensile strength, tensile modulus and elongation). In most cases, the dispersion can be applied to a substrate using any convenient application method, such as brushing, spraying, and the like, and is then permitted to cure at room or slightly elevated temperature. Higher curing temperatures can be used if desired, but are not necessary.

A variety of other water-soluble and/or water dispersible polymers may be added to the polyurethane dispersion if desired to optimize its properties for specific applications. These additional polymers may provide specific functionality, such as room- or elevated temperature crosslinking, improved adhesion and/or crosslinking with various substrate materials, and the like. They may in some instances reduce the cost of the dispersion. The additional polymers are preferably compatible with the polyurethane dispersion in the sense that they do not phase-separate from the dispersion when mixed with it at the desired proportions.

Among the additional polymers that may be added to the dispersion are additional quantities of the functionalized oil, polyvinyl alcohol, various water-dispersible melamine resins, such melamine-formaldehyde, urea-formaldehyde, benzoguanimine-formaldehyde glycoluril-formaldehyde and/or phenol-formaldehyde resins, various rubber latices, acrylic latices, wax dispersions and the like. Resins of these types are available in the form of dispersions in water, and can be used in that form if desired. Stabilizers may be added if necessary to maintain the additional polymer dispersed or dissolved in the polyurethane dispersion.

Dispersions of particular interest include the following blends of the polyurethane dispersion:

A. Blends of the polyurethane dispersion with additional quantities of the functionalized oil, usually in the presence of some external surfactant. The additional functionalized oil can polymerize with itself and with the conjugated groups on the polymer particles to increase hardness and water-resistance in the cured polymer. The additional functionalized oil may constitute from 5 to 95%, preferably 5-50% by weight of the combined solids.

B. Blends of the polyurethane dispersion with a polyvinyl alcohol (PVA). Hydroxyl groups on the polyvinyl alcohol can hydrogen bond with urethane/urea linkages on the polyurethane particles to form a quasi-IPN. The polyvinyl alcohol improves adhesion to polar substrates such as wood and other cellulosic materials. In addition, the polyvinyl alcohol tends to be a less expensive material than some of the other components, and its presence can reduce the overall cost of the dispersion somewhat. The OH group of PVA can be reacted with melamine resins to form an IPN. The PVA may constitute from 5 to 95%, preferably 10-75% by weight of the combined solids.

C. Blends of the polyurethane dispersion or blends A or B with melamine-formaldehyde, urea-formaldehyde, benzoguanimine-formaldehyde and/or glycoluril-formaldehyde resins. These resins are preferably water-miscible or compatible with the polyurethane particles so a one-phase compatible blend is formed. The melamine-formaldehyde, urea-formaldehyde, benzoguanimine-formaldehyde and/or glycoluril-formaldehyde resin with polymerize with itself at elevated temperatures to form a second polymer network, and can graft to the polyurethane particles by reaction with carboxyl, hydroxyl, urea and/or urethane groups on the polyurethane polymer. The melamine-formaldehyde, urea-formaldehyde, benzoguanimine-formaldehyde and/or glycoluril-formaldehyde resin will also react with any additional functionalized oil or PVA that may be present. The melamine-formaldehyde, urea-formaldehyde, benzoguanimine-formaldehyde and/or glycoluril-formaldehyde resin can also react with polar groups on a substrate (such as hydroxyl groups in cellulosic substrates like wood), thereby improving bonding, water resistance and strength when the blends are used in coating and adhesive applications. The presence of urea/formaldehyde resin can reduce cost somewhat as well. The dispersed polyurethane particles may constitute from 25-95% by weight of the combined solids, especially from about 25-75%.

D. Blends of the polyurethane dispersion or any of blends A, B or C with a phenol/formaldehyde resin. The phenol/formaldehyde resin will polymerize with itself at elevated temperatures to form a second polymer network, and can graft to the polyurethane particles by reaction with hydroxyl, carboxyl, urea and/or urethane groups on the polyurethane polymer. As with the polyvinyl alcohol and urea/formaldehyde resins, the presence of a phenol/formaldehyde resin can reduce overall product cost. The phenol/formaldehyde resin may constitute from about 2 to about 50% of the combined solids weight.

The dispersion can be varied to modify its properties and those of the composites. Increasing the amount of functionalized oil used to make the polyurethane will tend to decrease the elasticity but increase the modulus of the cured system. This leads to the formation of a more rigid and tough product. Increasing the amount of melamine resin tends to create a more highly crosslinked, more rigid polymer network that forms a stiffer, more brittle composite.

The products of the invention are particularly useful in adhesive and coating applications. Examples of such applications are varnishes and finishes for wood, steel, plastics, oriented strand board and other wood products and automotive applications; adhesives for construction, industrial and automotive applications; sealants and caulks and the like, binders for plywood and oriented strand board, and the like. The products may be formulated into a variety of one- or two-component curable systems that may be neat, solvent-borne or water-borne. The formulated products are preferably neat or water-borne. They are preferably substantially free (i.e., contain <5%, preferably <1%, more preferably <0.5% by weight combined) of volatile organic compounds, free isocyanate compounds and free formaldehyde.

The products of the invention may contain a variety of other components in addition to the specific materials described above. The selection of these other components will depend on the requirements of the particular end-use application. In general, these other components may include, for example, pigments, dyes, fillers, dryers, wetting agent, fire retardants, rheological and viscosity modifiers, dispersants, surfactants, preservatives, antimicrobials, pesticides, blowing or frothing agents and the like. If desired, a colorant can be added to the dispersion, in order to produce a composite product that is colored for marketing, branding or aesthetic purposes. Suitable colorants include, for example, pigments such as titanium dioxide, iron oxide, carbon black and other inorganic or organic pigments, dyes of various types, and the like.

The following examples are provided to illustrate the invention, but are not intended to limit its scope. All parts and percentages are by weight unless otherwise indicated.

EXAMPLE 1

Chinese tung oil (82.1 g, ~0.088 moles), trimethylolpropane (TMP) (23.6 g, ~0.193 moles) and 0.49 g of a calcium naphthenate catalyst containing about 5% calcium (CEM-ALL, by OMG Americas, Inc.) are charged into a reaction kettle equipped with stirrer, thermometer, nitrogen inlet, condenser and heat jacket. The catalyst concentration is about 0.03%, based on 100% calcium naphthenate. The mixture is heated to about 200° C. under nitrogen. When the reaction temperature reaches 70° C., an opaque homogeneous liquid mixture is formed with a light color and low viscosity. As the temperature reaches about 150° C., the liquid mixture becomes translucent with a light color. When the mixture is heated at 190-200° C. for about 15-20 minutes it becomes transparent and lightly colored. However, it becomes translucent again after cooling, indicating that the transesterification reaction has not been completed. After heating an additional 20-30 minutes at about 200° C., the liquid becomes transparent and remains transparent and lightly colored after cooling to room temperature. The solubility of the mixture is evaluated by mixing a portion of it with anhydrous methanol or with anhydrous ethanol, in each case at a 1:3 volume ratio (mixture to alcohol). Only about 60-70% of the mixture is miscible or soluble in the alcohols, indicating that the reaction is not complete. The mixture is then heated for about 30 minutes more at 190-200° C., at which time it has become essentially entirely soluble in each of the alcohols. The color of the mixture is slightly darker than before. The temperature of the mixture is then reduced quickly to room temperature with a nitrogen purge to prevent additional oxidative color changes. The functionalized tung oil has a slightly greater viscosity and slightly higher color than the original tung oil. The functionalized oil has a theoretical equivalent weight of about 199.8. It reacts with aromatic polyisocyanates such as polymeric MDI (PAPI 94, Dow Chemical Company) and "liquid" MDI (Isonate 143L, Dow Chemical Company) at room temperature to form a very tough and strong thermosetting material because of the crosslinking reaction between OH groups in the functionalized oil and NCO groups in the polyisocyanates.

EXAMPLE 2

Example 1 is repeated, except that the calcium naphthenate catalyst is replaced with calcium chloride. Calcium chloride is a solid, which allows for it to be removed easily from the product by filtering or centrifuging. Removing the catalyst has advantages in some applications where residual catalysts may interfere with other additives (such as, for example melamine-urea resins which engage in acid-catalyzed reactions). The reaction proceeds more slowly at about 200° C. than the calcium naphthenate-catalyzed reaction of Example 1. The more prolonged exposure to heat causes the functionalized oil product to become slightly darker and more viscous than the product of Example 1. The functionalized product reacts with polyisocyanates at room temperature similarly to the product of Example 1.

EXAMPLE 3

Example 1 is repeated again, except that the calcium naphthenate catalyst is replaced with another solid catalyst, zinc chloride. The reaction proceeds more slowly at about 200° C. than the calcium naphthenate-catalyzed reaction of Example 1, again causing a slightly darker and more viscous product to be formed. The functionalized product reacts with polyisocyanates at room temperature similarly to the product of Example 1.

EXAMPLE 4

Example 1 is repeated again, replacing the calcium naphthenate with 8% by weight Nuxtra™ brand zinc soap of C8-C12 branched chain synthetic carboxylic acids (Condea Servo LLP). The reaction proceeds more slowly than seen in Example 1, leading to a slightly darker and more viscous product.

EXAMPLE 5

Example 1 is repeated again, replacing the calcium naphthenate with 6% by weight Nuodex™ brand cerium naphthenate (Condea Servo LLC). Results are similar to Example 4.

EXAMPLE 6

Example 1 is repeated again, replacing the calcium naphthenate with 4% by weight Nuodex™ brand Rare Earth naphthenates (Condea Servo LLC). Results are similar to Example 4.

EXAMPLE 7

Example 1 is repeated, replacing the TMP with an equal number of moles of trimethylolethane (TME). TME is a higher melting material than TMP and as a result the reaction proceeds slowly until the melting temperature of the TME is reached (about 200° C.). Once the TME melts, it reacts with tung oil similarly to TMP. The reaction is complete (as determined by the solubility test described in Example 1) after heating the TME and tung oil at 200-205° C. for about 30-40 minutes. The resulting functionalized oil is slightly darker and more viscous that that formed in Example 1. It reacts rapidly with aromatic polyisocyanates such as polymeric MDI (PAPI 94, Dow Chemical Company) and "liquid" MDI (Isonate 143L, Dow Chemical Company) at room temperature. The resulting polyurethanes exhibit better tensile strength, modulus and chemical resistance compared to those made using the functionalized oil of Example 1. These property differences are believed to be due to at least in part of the structure of TME, which has a methyl group instead of the ethyl group of TMP.

EXAMPLE 8

Example 1 is repeated, replacing the TMP with di-trimethylol propane (DITMP) at a molar ratio of about 1:1 (based on the amount of tung oil). DITMP is a ~250 MW dimer of TMP with an ether linkage and four primary OH groups. It has a lower melting temperature than TME. Fewer moles of DITMP are used because of its higher functionality. The reaction proceeds very similarly to that of TMP and tung oil as described in Example 1. The product is very similar to that of Example 1 in terms of color, viscosity, and reactivity with a polyisocyanate.

EXAMPLE 9

Example 1 is repeated using various concentrations of the calcium naphthenate catalyst as follows:
Example 9A: 0.05% (available calcium ion)
Example 9B: 0.03%
Example 9C, 0.01%
Example 9D: 0.005%
Example 9E: 0.0006%

The reaction proceeds most rapidly in Example 9A (which uses the highest concentration of catalyst), it being completed in about 1-1.5 hrs at 200 C. However, the product is somewhat darker than that of Example 1. The product of Example 9A reacts rapidly with aromatic polyisocyanates as described in Example 1, due to the residual catalytic activity of the calcium ion. However, the product does not react well with Cymel 303, 350, 1123 or 1172 resins due to the inhibiting effect of the residual calcium catalyst.

As the catalyst concentration is decreased from Example 9A through Example 9E, the reaction takes longer and the color of the product tends to become progressively lighter. In Example 9E, the low catalyst concentration requires a somewhat higher (220° C.) reaction temperature in order to complete the reaction in 2-3 hours. The residual catalyst in the product of Example 9E does not have any significant adverse affect on the reaction of the product with a melamine resin.

EXAMPLE 10

Example 1 is repeated 4 times, using different molar ratios of tung oil to TMP as follows:
Example 10A: 1:1 tung oil:TMP molar ratio
Example 10B: 1:2 tung oil:TMP molar ratio
Example 10C: 1:2.5 tung oil:TMP molar ratio
Example 10D: 1:3 tung oil:TMP molar ratio As the relative molar quantity of TMP increases from Example 10A through Example 100D, the product tends to become lighter in color and the reaction rate increases. The number of free hydroxyl groups in the functionalized oils progressively increases in the same order, and the molecular weight of the oils progressively decreases. All of the functionalized oils react readily with aromatic polyisocyanates as described in Example 1, but the reactivities of the functionalized oils increase with increasing amounts of free hydroxyl groups and decreasing molecular weight. The green strength and rigidity of the resulting polyurethanes increases from Example 10A to Example 10D. However, all of the polyurethanes cure further over the course of one week at room temperature to become tough polymers, due to the polymerization of the pendant double bond systems provided by the functionalized tung oil.

EXAMPLE 11

A 1:1 by weight mixture of tung oil and linseed oil is prepared by simple mixing. Example 1 is then repeated, substituting an equal molar quantity of this mixture for the tung oil used in Example 1. The reaction proceeds somewhat faster than in Example 1 and the resultant functionalized mixed oil has a light color and low viscosity compared to functionalized tung oil of Example 1. The functionalized oil mixture is reacted with Isonate™ 143L polyisocyanate at room temperature to produce a polyurethane. The resulting polyurethane has a mixture of pendant hydrocarbyl groups. Most of those derived from the tung oil contain conjugated groups having three carbon-carbon double bonds, whereas those derived from the linseed oil do not contain a conjugated double bond system.

EXAMPLE 12

Example 11 is repeated, substituting an equal weight of soybean oil for the linseed oil, with similar results. A polyurethane made by reacting the resulting functionalized oil with Isonate™ 143L polyisocyanate has a mixture of pendant hydrocarbyl groups. Most of those derived from the tung oil contain a conjugated group with three carbon-carbon double bonds, whereas those derived from the linseed oil do not contain a conjugated double bond system.

EXAMPLE 13

Example 1 is repeated again, this time substituting an equimolar mixture of TME and TMP for the TMP. The mole ratio of tung oil to polyols is about 1:2. The reaction speed is increased significantly compared to Example 7 (TME only), it being only slightly slower than Example 1. A polyurethane made by reacting the functionalized oil with a "liquid MDI" (Isonate 143L from Dow Chemical) exhibits better tensile strength and modulus than similar polyurethane made using the functionalized oil from Example 1.

EXAMPLE 14

Example 1 is repeated, substituting an equal weight of South American tung oil for the Chinese tung oil used in Example 1. The resulting functionalized oil has a lighter color and lower viscosity than the functionalized oil of Example 1. It is easily cured with aromatic polyisocyanates as described in Example 1 at room temperature without additional catalyst, to form a tough, rigid material.

COMPARATIVE SAMPLE 1

Chinese tung oil (82.1 g), glycerol (16.2 g) and calcium naphthenate (0.49 g of 5% Calcium CEM-ALL, by OMG Americas, Inc.) are charged into a reaction kettle equipped with stirrer, thermometer, nitrogen inlet, condenser and heat jacket. The reaction kettle is heated under stirring and purging nitrogen until the temperature reaches 210° C. After the reaction mixture is kept at this temperature for 0.5 hour, it is increased to 230° C. for 2-3 hours. The reaction mixture darkens during this period and its viscosity increases. However, at the end of this period the mixture is still cloudy, indicating that the reaction is not completed. A sample of the mixture is subjected to the solubility test described in Example 1, but most of the product is not miscible with the alcohol. The temperature is increased to 240° C. for another 30 minutes, at which time the reaction mixture becomes even darker and significantly more viscous. A sample of the mixture again fails the solubility test. After another 30 minutes at 240° C., the conjugated groups of the tung oil rapidly polymerize. The reaction is then stopped by cooling it. A solid, thermoset polymer of tung oil is obtained.

COMPARATIVE SAMPLE 2

Comparative Sample 2 is repeated except the catalyst concentration is doubled. The reaction rate is increased but the product darkens and becomes viscous even more rapidly. The conjugated groups of the tung oil polymerize to form a solid thermoset polymer before the functionalization reaction is completed.

COMPARATIVE SAMPLE 3

Comparative Sample 1 is again repeated, replacing the glycerol with 11.97 g of pentaerythritol. Because the pentaerythritol melts at 262° C., it is necessary to heat the mixture above this temperature to initiate the reaction. Once the pentaerythritol melts, the functionalization reaction begins but the product darkens rapidly. The reaction mixture quickly polymerizes to form a solid thermoset polymer.

EXAMPLE 15

Example 1 is repeated six times to form Examples 15A-15F. In each case, an equal weight of another oil is substituted for the Chinese tung oil used in Example 1, as follows:
Example 15A: vegetable oil (non-drying)
Example 15B: corn oil (non-drying)
Example 15C: Canola oil (non-drying)
Example 15D: soybean oil (semi-drying)
Example 15E: linseed oil (drying)
Example 15F: dehydrated castor oil (drying)

The resulting functionalized oils are all easily cured with polyisocyanates such as carbodiimide-modified MDI (Isonate 143L from Dow Chemical), and polymeric MDI (PAPI 94, from Dow Chemical) at room temperature without additional catalyst, to form a tough, rigid material. Water and chemical resistance are lower than that of Example 1.

EXAMPLE 16

Anionic waterborne polyurethane dispersions (Example 16A-16D) are prepared using functionalized oil Examples 10B and 10C. A reaction kettle equipped with stirrer, thermometer, dry nitrogen inlet and heating jacket is charged with a polyester polyol (Lexorez 1100-35, eq. wt=1600, Inolex Chem. Co.), functionalized tung oil, dimethylolproprionic acid (DMPA), N-methylpyrrolidone (NMP), organotin catalyst (T12, from Air Products and Chemicals) and 4,4' methylene, di (cyclohexyl isocyanate) ($H_{12}$MDI, Desmodur W by Bayer Chem. Co.). The proportions of materials are as indicated in Table 1 below. The reaction kettle is heated at 80-85° C. under dry nitrogen with stirring for about 1-2 hr until the % NCO of the mixture approaches the theoretical level. The product of this reaction is an NCO-terminated prepolymer containing pendant COOH groups. The temperature inside the reactor is. then decreased to 60-65° C. Triethylamine (TEA) is then added (without additional nitrogen) to neutralize the pendant —COOH groups. After allowing the TEA to react for 10-15 minutes, the reactor temperature is decreased to about 40° C. Deionized water is then added with vigorous agitation to form a uniform aqueous dispersion of the prepolymer. Ethylenediamine (EDA) is mixed with water at 50/50 weight ratio and then added into the above prepolymer with vigorous agitation to chain-extend the prepolymer to form a polyurethane. The polyurethane contains pendant hydrocarbyl groups containing three aliphatic carbon-carbon double bonds in conjugation, which are derived from the tung oil.

TABLE 1

| Example | 16A | 16B | 16C | 16D |
|---|---|---|---|---|
| Polyester Polyol | 100 | 100 | 100 | 100 |
| Example 10B product | 12.5 | 12.5 | 0.0 | 0.0 |
| Example 10D product | 0.0 | 0.0 | 9.3 | 11.1 |
| DMPA | 4.2 | 6.7 | 6.7 | 7.4 |
| NMP | 3.9 | 4.2 | 4.1 | 4.3 |
| T-12 | 0.05 | 0.05 | 0.05 | 0.05 |
| $H_{12}$MDI | 39.3 | 47.2 | 47.2 | 51.9 |
| NCO/OH ratio | 1.6 | 1.6 | 1.6 | 1.6 |
| % NCO in prepolymer | 3.0 | 3.3 | 3.4 | 3.6 |
| TEA | 3.2 | 5.1 | 5.1 | 5.6 |
| Water | 236 | 254 | 250 | 262 |
| EDA | 3.0 | 3.6 | 3.6 | 4.0 |
| Solids, % | 40 | 40 | 40 | 40 |
| Functionalized Oil/ Polyester Polyol (Eq./Eq.) | 1.0/1.0 | 1.0/1.0 | 1.0/1.0 | 1.0/1.0 |
| Functionalized Oil, wt. % (based on polyurethane) | 7.7 | 7.1 | 5.4 | 6.2 |

Films are made from each of dispersion examples 16A-16B by applying the dispersion to a aluminum mold with a release agent, and allowing the applied coating to dry at RT for 12 days or 75° C. for 48 hrs before testing. Tensile strength, tensile modulus and elongation are measured by using a computer controlled Instron Tester Model 5565. Water resistance is evaluated by immersing the dried films in water at room temperature for three months; evaluations of water resistance are made through visual examination of the film. NaOH and HCl resistances are evaluated by immersing the film for 3-5 hours and examining visually. Isopropanol, methyl ethyl ketone and toluene resistance is evaluated by apply drops of the solvents onto the film for 30 minutes and evaluating visually. Results are as indicated in Table 2.

TABLE 2

| Example No. | 16A | 16B | 16C | 16D |
|---|---|---|---|---|
| Mechanical properties Tensile strength, psi | | | | |
| 75° C. × 48 hrs | 2711 | 2303 | 2643 | 3144 |
| RT × 12 days | 2523 | 2163 | 2580 | — |
| Modulus at 100%, psi | | | | |
| 75° C. × 48 hrs | 772 | 1048 | 1176 | 1548 |
| RT × 12 days | 835 | 1244 | 1334 | — |
| Elongation % | | | | |
| 75° C. × 48 hrs | 710 | 490 | 580 | 440 |
| RT × 12 days | 562 | 365 | 440 | — |
| Water resistance | | | | |
| RT × one month | Excellent | Excellent | Excellent | Excellent |
| RT × three months | Excellent | Excellent | Excellent | Excellent |
| Chemical resistance | | | | |
| 5% NaOH | Excellent | Excellent | Excellent | Excellent |
| 5% HCl | Excellent | Excellent | Excellent | Excellent |
| IPA | Excellent | Excellent | Excellent | Excellent |
| MEK | Excellent | Excellent | Excellent | Excellent |
| Toluene | Excellent | Excellent | Excellent | Excellent |

The data in Tables 1 and 2 illustrate that polyurethanes having excellent physical properties and water and chemical resistance are formed using in the range of about 5-8% of functionized tung oil. The modulus increases and elongation decreases from Example 16A to 16B and from Example 16C to 16D, due to the increasing proportion of a short chain diol (DMPA). All of Examples 16A to 16D exhibit excellent water resistance. Even after being immersed in water for three months at room temperature, Examples 16A-16D all remain transparent and retain good mechanical properties. For comparison, an otherwise similar polyurethane dispersion made without the functionalized oil turns white after being immersed in water for about 12 hrs; after one month it has become significantly swollen and has poor physical properties. The superior water resistance of Examples 16A-16D is attributed to the crosslinking reaction of the conjugated double bond system, which occurs in the presence of atmospheric oxygen. The chemical resistances of Examples 16A-16D are also significantly better than the polyurethane which is not made with the functionalized oil.

EXAMPLE 17

Polyurethane samples 17A-C are made using the same equipment and procedure as described in Example 16, except the polyester polyol is replaced with a polypropylene glycol having a molecular weight of 1020 (Poly-G55-112, Arch Chem. Co.). The formulations are shown in the Table 3. The water and chemical resistance of samples 17A-17C are evaluated using the methods described in Example 16, with results as reported in Table 3.

TABLE 3

| Sample No. | 17A | 17B | 17C |
|---|---|---|---|
| Polypropylene glycol | 70 | 70 | 70 |
| Functionalized Oil Sample 10B | 17.6 | 21.7 | 24.4 |
| DMPA | 10.6 | 11.6 | 12.2 |
| H$_{12}$MDI | 80.7 | 88.0 | 92.9 |
| T-12 | 0.05 | 0.05 | 0.05 |
| NMP | 4.5 | 4.8 | 5.0 |
| NCO/OH | 1.6 | 1.6 | 1.6 |
| % NCO in prepolymer | 5.3 | 5.4 | 5.5 |
| TEA | 8.0 | 8.7 | 9.2 |
| Water | 281 | 301 | 314 |
| EDA | 6.2 | 6.8 | 7.2 |
| Solids, % | 40 | 40 | 40 |
| Functionalized Oil/ Polypropylene glycol (Eq./Eq.) | 0.7/1.0 | 0.8/1.0 | 0.9/1.0 |
| Functionalized Oil, Wt. % (based on polyurethane) | 9.1 | 10.5 | 11.3 |
| Water resistance | | | |
| RT × one month | Excellent | Excellent | Excellent |
| RT × three months | Excellent | Excellent | Excellent |
| Chemical resistance | | | |
| 5% NaOH | Excellent | Excellent | Excellent |
| 5% HCl | Excellent | Excellent | Excellent |
| IPA | Excellent | Excellent | Excellent |
| MEK | Excellent | Excellent | Excellent |
| Toluene | Excellent | Excellent | Excellent |

Each of Samples 17A-17C exhibits excellent water and chemical resistance. As the proportion of the functionalized oil increases (from Sample 17A-17β-17C), the polyurethanes become more rigid (increased hardness) and slightly more yellow.

A similarly prepared polyurethane made without the functionalized oil has very poor water resistance, losing its mechanical properties after 1 month immersion in room temperature water.

EXAMPLE 18

Example 16A is repeated, substituting the functionalized oil of Example 14 for that of Example 10A. The polyurethane dispersion appears somewhat less colored due to the lighter color of the Sample 14 functionalized oil. A film made from the resulting polyurethane dispersion has similar water and chemical resistance as Sample 16A.

Example 16A is repeated again, this time substituting the functionalized oil of Example 7 for that of Example 10A. Water and chemical resistance are even better than those of Example 16A.

COMPARATIVE SAMPLES 4-8

Example 16A is repeated several times, using the functionalized oils of Example 15A-15E, to form Comparative Samples 4-8, as follows:

| Comparative dispersion sample no. | Comparative functionalized oil sample no. |
|---|---|
| 4 | 15A |
| 5 | 15B |
| 6 | 15C |
| 7 | 15D |
| 8 | 15E |

Films made from these comparative dispersions have inferior water and chemical resistance and inferior mechanical properties, compared to those of Examples 17A-17D.

EXAMPLE 19

An aqueous dispersion (Example 19A) of a hydroxyl-terminated, cationic polyurethane prepolymer is prepared as follows, using the same equipment as described in Example 16. Functionalized oil Sample 9E (30.2 g, 0.152 equivalents), N-methyldiethanolamine (NMDEA, 9.03 g, 0.152 eq., 0.076 mole) and $H_{12}MDI$ (19.9 g, 0.152 eq.) are charged into the reactor and heated at 75-80° C. for 1-2 hours until all the NCO groups have reacted (as confirmed by FTIR). The product of this reaction is a low molecular weight hydroxyl-terminated prepolymer containing tertiary nitrogen groups. Anhydrous acetic acid (4.6 g, 0.076 mole) is then added to the reactor to neutralize the tertiary nitrogen groups. The neutralized prepolymer is dispersed into water.

A portion of the prepolymer dispersion is blended with a commercially available, methylated melamine resin (Cymel™ 350, from Cytec LLC) at a 70/30 weight ratio (prepolymer/melamine resin). The melamine resin is miscible in the prepolymer dispersion. Crosslinking is carried out by applying a coating of the mixture to a steel substrate, and heating the coating at 120-128° C. for about 20-30 min. The double bond systems also react under the conditions of the crosslinking reaction. A film having good mechanical properties is obtained. Similar results (Example 19B) are obtained when the Cymel™ 350 resin is replaced with a like quantity of an n-butylated, high imino melamine resin (Cymel™ 1158, from Cytec LLC).

For comparison, prepolymer dispersions (Comparative Samples 9-13) are made in the same general manner as Example 19A, except the functionalized tung oil is replaced, respectively, with the functionalized vegetable oil of Example 15A (Comp. Sample 9), the functionalized corn oil of Example 15B (Comp. Sample 10), the functionalized canola oil of Example 15C (Comp. Sample 11), the functionalized soybean oil of Example 15D (Comp. Sample 12), and the functionalized linseed oil of Example 15E (Comp. Sample 13). When blended with the methylated melamine resin (Cymel™ 350) and cured, the resulting films have inferior mechanical properties, compared with Example 19A.

EXAMPLE 20

Various commercial resins are blended with a portion of polyurethane dispersion Example 16A by mixing at room temperature for about 30 minutes at a 2:1 (functionalized tung oil-based polyurethane dispersion:resin) weight ratio. The mixtures are then cured at 125° C. for 20 minutes. Results are as reported in Table 4. Viscosity observations are made after about 2-3 minutes of mixing at room temperature. Compatibility is observed visually after mixing at room temperature for about 30 minutes.

TABLE 4

| Resin | Observed Viscosity Change | Compatibility | Cured Polymer Characteristics |
|---|---|---|---|
| Cymel™ U80[1] | Slight Increase | Incompatible | Tacky, transparent |
| Cymel™ U60[2] | Slight Increase | Compatible | Transparent, tough |

TABLE 4-continued

| Resin | Observed Viscosity Change | Compatibility | Cured Polymer Characteristics |
|---|---|---|---|
| Cymel™ U65[2] | Slight Increase | Compatible | Transparent, tough |
| Cymel™ 1158[3] | Slight Increase | Compatible | Transparent, rigid |
| Cymel™ 385[4] | Slight Increase | Compatible | Opaque, rigid |
| Cymel™ 1172[5] | Slight Increase | Compatible | Tacky, transparent |
| Cymel™ 1170[5] | Slight Increase | Incompatible | Tacky, transparent |
| Cymel™ 1123[6] | Slight Increase | Incompatible | Tacky, transparent |
| Cymel™ 370[7] | Increased | Compatible | Transparent, rigid |
| Cymel™ 350[5] | Slight Increase | Compatible | Transparent, tough |
| Cymel™ 325[4] | Increased | Incompatible | Transparent, rigid, bubbles |
| Cymel™ 303[8] | Increased | Compatible | Transparent, soft |
| Cymel™ 380[7] | Slight Increase | Compatible | Transparent, rigid, bubbles |
| Cymel™ MB 80[8] | Slight Increase | Incompatible | Transparent, tacky |

[1]Butylated urea resin sold by Cytec Industries.
[2]Methylated urea resin sold by Cytec Industries.
[3]n-Butylated high imino melamine resin sold by Cytec Industries.
[4]Methylated high imino melamine resin sold by Cytec Industries.
[5]Glycoluil melamine resin sold by Cytec Industries.
[6]Benzo-guanamine resin sold by Cytec Industries.
[7]Partially methylated melamine resin sold by Cytec Industries.
[8]Highly methylated melamine resin sold by Cytec Industries.

EXAMPLE 21

A portion of polyurethane dispersion Example 16A is blended with a 25% solution of a water-miscible polyvinyl alcohol (Elvanol 51-05, Dupont) in water at solids ratios of 1:1 (Example 21A), 1:2 (Example 21B) and 2:1 (Example 21C). Dried films cast from the resultant blends adhere very well to wood, glass, steel and aluminum. However, water resistance is poor because the polyvinyl alcohol is water soluble and the PVA does not engage in crosslinking reactions with the polyurethane particles (although hydrogen bonding does occur). Water resistance is improved significantly when Cymel™ 1172 resin is added to the blend, and the resulting films cured at elevated temperature. The melamine resin reacts with the carboxyl or urethane groups on the functionalized oil and the hydroxyl groups of the polyvinyl alcohol to form a crosslinked, three-component interpenetrating network system.

Similar results are seen when other commercial polyvinyl alcohol products (Elvanol 51-03, 70-06 and 70-03, all from Dupont) are substituted for the Elvanol 51-05 polyvinyl alcohol.

EXAMPLE 22

Three commercial phenol-formaldehyde resins are heated at 120-180° C. to form cured films. The phenol-formaldehyde resins are GP 4178 (low MW, 71-73% solids); GP 3121 (intermediate MW, 54-55% solids); and GP 2378 (high MW, 41-42% solids), all from Georgia-Pacific Resins, Inc. GP 4178 has a strong formaldehyde odor, whereas the others have lesser odors. When cured, the GP4178 product forms a transparent tough film; GP3121 forms a rigid brittle film with bubbles and red-brown color, and GP2378 forms a very brittle film with a lot of bubbles and dark red-brown color.

None of these resins are miscible with the functionalized tung oil-based polyurethane dispersion from Example 16A.

However, a three-component mixture is formed using any of these phenol-formaldehyde resins, by pre-mixing the functionalized tung oil-based polyurethane dispersion of Example 16A with Elvanol 51-05 polyvinyl alcohol such as is described in Example 21. The polyvinyl alcohol functions as a compatibilizer for the polyurethane dispersion and the phenol formaldehyde resin. When the three-component mixtures are formed into films and cured (at 120-180° C.), the cured films are more flexible than those of the phenol-formaldehyde resins alone, have fewer bubbles and lower color. Varying the relative ratios of the components allows one to vary the properties and overall cost of the resin systems.

EXAMPLE 23

A four component waterborne IPN adhesive is prepared by adding a butylated urea formaldehyde resin to the three component (phenol-formaldehyde/functionalized tung oil-based polyurethane dispersion/polyvinyl alcohol) adhesive system of Example 22. The functionalized tung oil-based polyurethane dispersion of Example 16A is mixed with a polyvinyl alcohol (Elvanol™ 51-05) solution in water at a solids weight ratio of 2:1. The phenol-formaldehyde resin (GP 3121) and resin (Beetle™ U-80) are added at solids weight ratios of 1:2. Films cast from this mixture are cured at 120° C. for 25 minutes to produce a tough, lightly colored product having very good water resistance.

Again, by varying the ratios of components, the properties of the cured films can be tailored to satisfy a wide range of performance requirements.

What is claimed is:

1. An isocyanate terminated, polyurethane group-containing prepolymer having an isocyanate content of from 0.5 to 35% by weight and containing pendant aliphatic hydrocarbyl groups of from 8 to 22 carbon atoms, wherein at least 50% by weight of such hydrocarbyl groups contain a conjugated group of three or four aliphatic carbon-carbon double bonds, wherein the prepolymer is a reaction product of a polyisocyanate and a functionalized oil having an average of at least two free hydroxyl groups, the functionalized oil being the reaction product of tung oil and a polyol having at least three primary hydroxyl groups per molecule and a melting temperature of 220° C. or below.

2. The prepolymer of claim 1 which is isocyanate-terminated.

3. The prepolymer of claim 1 which is water-dispersible.

4. A method for making a dispersion of polyurethane particles, comprising
　A. forming a water dispersible, isocyanate-terminated prepolymer having an isocyanate content of from 0.5 to 35% by weight by reacting a stoichiometric excess of a polyisocyanate with an isocyanate-reactive composition, the isocyanate-reactive composition including at least (1) an isocyanate-reactive compound having an average of at least two free hydroxyl groups per molecule and pendant hydrocarbyl or substituted hydrocarbyl groups of which at least 50% contain three or four aliphatic carbon-carbon double bonds in conjugation, said isocyanate-reactive compound being the product of tung oil and a polyol having at least three primary hydroxyl groups per molecule and a melting temperature of 220° C. or below and at least one of (2) an isocyanate-reactive compound containing an anionic or cationic group or precursor to such an anionic or cationic group or (3) an isocyanate-reactive, nonionic hydrophilic compound;
　B. if component (2) is used and contains a precursor to an anionic or cationic group, neutralizing said precursor to form an anionic or cationic group,
　C. dispersing the isocyanate-terminated prepolymer to form a plurality of prepolymer droplets stably dispersed in an aqueous phase; and
　D. reacting the dispersed isocyanate-terminated prepolymer with a chain extender to form a plurality of polyurethane particles stably dispersed in an aqueous phase.

5. A dispersion of polyurethane particles in an aqueous phase, wherein the polyurethane particles contain pendant hydrocarbyl groups prepared in accordance with claim 4.

6. An adhesive comprising the dispersion of polyurethane particles of claim 5.

7. An adhesive comprising a dispersion of polyurethane particles in an aqueous phase, wherein the polyurethane particles contain pendant hydrocarbyl groups having a conjugated group containing at least two aliphatic carbon-carbon double bonds and, further comprising a melamine-formaldehyde, urea-formaldehyde, benzoguanimine-formaldehyde and/or glycoluril-formaldehyde resin, or mixture of two or more thereof.

8. An adhesive comprising a dispersion of polyurethane particles in an aqueous phase, wherein the polyurethane particles contain pendant hydrocarbyl groups having a conjugated group containing at least two aliphatic carbon-carbon double bonds and, further comprising a polyvinyl alcohol or a phenol-formaldehyde resin, or a mixture thereof.

9. An adhesive comprising a dispersion of polyurethane particles in an aqueous phase, wherein the polyurethane particles contain pendant hydrocarbyl groups having a conjugated group containing at least two aliphatic carbon-carbon double bonds and, which cures to from an interpenetrating polymer network.

* * * * *